Patented May 2, 1939

2,156,642

UNITED STATES PATENT OFFICE 2,156,642

PURIFICATION OF CARBOXYLIC ACID AMIDES

Harold Slagh, Midland, Mich., assignor to The Dow Chemical Company, Midland, Mich., a corporation of Michigan No Drawing. Application January 30, 1937, Serial No. 123,296

11 Claims. (Cl. 260—561)

This invention concerns the purification of carboxylic acid amides.

A well known method for preparing carboxylic acid amides consists in destructively distilling the ammonium salts of aliphatic acids, whereby water, free acid and ammonia are first obtained in small amount, and finally the carboxylic acid amide distills over. The products, for example acetamide, prepared by such method have such high acidity, due to free acid contained therein, as to be unsuitable for many uses, e. g. in the preparation of pharmaceutical products. The presence of free acid catalyzes the hydrolysis of the carboxylic acid amide to form more acid and free ammonia. Such acid-contaminated product is corrosive to metals, so that if allowed to remain in contact with a metal container for any extended period of time, the container becomes corroded and the product is discolored. Crude commercial acetamide generally has a pH value of 4.1 to 5.5, corresponding to about 0.017 per cent to 0.3 per cent of free acetic acid. The removal of this excess acid in such a product necessitates an additional purification step comprising repeated crystallization from organic solvent in order to obtain a compound of more nearly neutral reaction.

In accordance with the invention, the destructive distillation of the ammonium salt of the aliphatic acid is interrupted at the point where substantially all of the water and the major portion of the free acid and ammonia has been removed. Then sufficient alkaline agent in solid form is added to the still charge and mixed therewith to neutralize the free acid present, after which distillation is continued to remove the carboxylic acid amide product. The product so obtained is substantially neutral and has a narrower boiling range and higher melting point than that heretofore made according to known procedures. The improved product is stabilized against hydrolysis, may be stored for long periods of time without the development of objectionable odors or free acid, and may be safely packed in metal containers.

In carrying out my invention the crude reaction product of ammonia and a saturated aliphatic carboxylic acid, such as acetic acid, is warmed at atmospheric pressure until substantially all of the water and the major portion of the free acid and ammonia is removed therefrom. A quantity of alkaline material, i. e. an alkali metal or alkaline earth metal hydroxide, an alkali metal carbonate or bicarbonate, etc., is then mixed therewith. The distilling operation is continued, first to remove small quantities of water formed by the reaction of the alkaline material with the acid present, and subsequently to recover a high yield of substantially pure carboxylic acid amide. The amount of alkaline material employed is dependent upon the acidity of the reaction mixture, but is usually not in excess of about 3 per cent by weight thereof. While more than this amount may be employed, if desired, only such quantity is required as is necessary to neutralize the free acid in the mixture. There is a tendency, when too great an excess is used, for the distilled product to be alkaline in reaction, and to be obtained in poorer quantity and in lower yield than when approximately theoretical quantities are utilized.

The above described method of purification is also of value in reducing the acidity of acid-contaminated commercial carboxylic acid amide products. In such instance it is sufficient to mix with the impure carboxylic acid amide an amount of alkaline agent sufficient to neutralize the acidity of the carboxylic acid amide product, as determined by titration of an aliquot portion thereof, and subsequently to separate the substantially neutral carboxylic acid amide product by fractional distillation of the mixture.

The following examples are illustrative of the practice of my invention but are not to be construed as limiting the same:

Example 1

201 pounds of glacial acetic acid; 53 pounds of low-boiling fraction from a previous acetamide distillation containing approximately 34.2 per cent acetic acid, 52 per cent acetamide, and 13.8 per cent water; and 79 pounds of an impure acetamide product comprising approximately 17.5 per cent acetic acid, 77.4 per cent acetamide, and 5.1 per cent water were mixed together in a stainless steel reactor equipped with a fractionating column. 58 pounds of gaseous ammonia was bubbled into the above mixture over a period of 18 hours at refluxing temperatures gradually increasing from 115° to 174° C. During the addition of the ammonia 71.5 pounds of a low-boiling aqueous fraction comprising approximately 5.6 per cent free ammonia, 11 per cent of acetic acid, and small amounts of ammonium acetate was distilled over through the fractionating column. The reaction vessel and fractionating column were then placed under a pressure of 2.9 inches of mercury absolute pressure, and two intermediate low-boiling fractions separated from the reaction mixture. The first fraction consisted of 84.5 pounds of a mixture of 49.2 per cent acetic acid, 44.9 per cent acetamide, and 5 per cent water, and the second fraction consisted of 68.5 pounds of mixed product containing 7.1 per cent acetic acid and 86 per cent acetamide. 3 pounds of anhydrous sodium carbonate was then added to the main body of the acetamide product in the still which by analysis contained 0.5 per cent free acetic acid. Distillation under reduced pressure was continued, whereby there was obtained 150.5 pounds of substantially odorless acetamide, melting at 79.2° C., having a pH of 6.8 and containing less than 0.006 per cent free acetic acid. The 71.5 pounds of aqueous mixture recovered during the passage of ammonia into the reaction mixture, and the two mid-fractions recovered in the early stages of the vacuum distillation were combined with 10 pounds of still residue and utilized as a starting material in the preparation of additional acetamide.

*Example 2*

328 grams of a commercial acetamide product having a pH of 4, and 5 grams of anhydrous sodium carbonate were stirred together at a temperature of approximately 85° C., the resulting mixture being alkaline to litmus. The mixture was then fractionally distilled under vacuum whereby there was obtained 309 grams of substantially odorless acetamide having a pH of 6.9 and melting at 80° C. A low-boiling fraction of 7 grams was found to consist essentially of acetamide but contained a trace of water and was not included in the main fraction of the product. The residue of 7 grams contained sodium acetate and a small amount of acetamide.

*Example 3*

100 grams of crude acetamide obtained by the destructive distillation of ammonium acetate, and having a pH of 3.8, was melted and intimately mixed with 0.5 gram of finely divided sodium hydroxide. Fractionation of this mixture resulted in the isolation of 97.5 grams of substantially odorless acetamide having a pH of 7.2 and melting at 80° C. A trace of water obtained as a low-boiling fraction in the distillation, and a residue of 2.5 grams of a mixture of sodium salts and acetamide, were discarded.

*Example 4*

In a similar manner 50 grams of commercial acetamide having a pH of 4.5 and 1 gram of potassium bicarbonate were mixed together and fractionally distilled under reduced pressure to obtain 47.5 grams of acetamide having a pH of 7.2.

*Example 5*

The treatment of 100 grams of the crude acetamide product described in Example 3 with 2.5 grams of calcium oxide, and subsequent distillation of the mixture yielded 98 grams of substantially pure acetamide melting at 80° C. and having a pH of 7.1. 2.5 grams of residue from the distillation was found to consist in the calcium salt of acetic acid. A low-boiling fraction comprising 1 gram of a mixture of water and acetamide was discarded.

*Example 6*

50 grams of commercial propionamide containing 0.4 per cent free propionic acid and having a highly objectionable odor was melted and mixed with 1 gram of finely divided anhydrous sodium carbonate. This mixture was fractionally distilled under reduced pressure whereby there was obtained 46 grams of substantially neutral propionamide melting at 79°–80° C. and of a greatly improved odor. A low-boiling fraction of 3.5 grams, consisting of water and propionamide, was discarded along with a distillation residue of 1 gram.

Other inorganic alkaline agents which may be substituted for those shown in the examples are potassium hydroxide, sodium bicarbonate, potassium carbonate, barium hydroxide (8H₂O), and magnesium oxide. The method may be employed for purifying other carboxylic acid amides such as butyramide (n), butyramide (iso), valeramide (iso), caprylamide, etc.

Other modes of applying the principle of my invention may be employed instead of those explained, change being made as regards the methods herein disclosed, provided the step or steps stated by any of the following claims or the equivalent of such stated step or steps be employed.

I, therefore, particularly point out and distinctly claim as my invention:

1. In the purification of an acid-contaminated carboxylic acid amide, the steps which consist in incorporating therewith a substantially anhydrous alkaline agent of sufficient strength to neutralize the acid present, and thereafter fractionally distilling the mixture to separate substantially neutral carboxylic acid amide therefrom.

2. In the purification of an acid-contaminated carboxylic acid amide, the steps which consist in incorporating therewith sufficient quantity of a substantially anhydrous alkaline agent to neutralize the acid present therein and subsequently fractionally distilling the mixture to separate substantially neutral carboxylic acid amide therefrom.

3. In the purification of an acid-contaminated carboxylic acid amide, the steps which consist in incorporating substantially anhydrous sodium carbonate therewith and thereafter fractionally distilling the mixture to separate substantially neutral carboxylic acid amide therefrom.

4. In the purification of an acid-contaminated carboxylic acid amide, the steps which consist in incorporating therewith sufficient substantially anhydrous sodium carbonate to neutralize the acid present therein and subsequently fractionally distilling the mixture to separate substantially neutral carboxylic acid amide therefrom.

5. In the purification of acid-contaminated acetamide, the steps which consist in incorporating therewith a substantially anhydrous alkaline agent of sufficient strength to neutralize the acid present, and thereafter fractionally distilling the mixture to separate substantially neutral acetamide therefrom.

6. In the purification of acetamide prepared by the thermal decomposition of ammonium acetate, the steps which consist in incorporating therewith sufficient quantity of a substantially anhydrous alkaline agent to neutralize the free acetic acid therein and subsequently fractionally distilling the mixture to separate substantially neutral acetamide therefrom.

7. In the purification of acid-contaminated acetamide, the steps which consist in incorporating substantially anhydrous sodium carbonate therewith and thereafter fractionally distilling the mixture to separate substantially neutral acetamide therefrom.

8. In the purification of acid-contaminated acetamide, the steps which consist in incorporating therewith sufficient substantially anhydrous sodium carbonate to neutralize the free acid therein and subsequently fractionally distilling the mixture to separate substantially neutral acetamide therefrom.

9. In the purification of an acid-contamined propionamide, the steps which consist in incorporating therewith a substantially anhydrous alkaline agent of sufficient strength to neutralize the acid present, and thereafter fractionally distilling the mixture to separate substantially neutral propionamide therefrom.

10. In the purification of an acid-contaminated propionamide, the steps which consist in incorporating substantially anhydrous sodium carbonate therewith and thereafter fractionally distilling the mixture to separate substantially neutral propionamide therefrom.

11. In the purification of an acide-contaminated propionamide, the steps which consist in incorporating therewith sufficient substantially anhydrous sodium carbonate to neutralize the free acid therein and subsequently fractionally distilling the mixture to separate substantially neutral propionamide therefrom.

HAROLD SLAGH.